US011459780B2

(12) United States Patent
Martin Iglesias et al.

(10) Patent No.: US 11,459,780 B2
(45) Date of Patent: Oct. 4, 2022

(54) FALL PROTECTION DEVICE

(71) Applicant: ENCOFRADOS J. ALSINA, S.A., Montcada I Reixac (ES)

(72) Inventors: Javier Martin Iglesias, Montcada I Reixac (ES); Pedro Xammar Bove, Montcada I Reixac (ES)

(73) Assignee: ENCOFRADOS J. ALSINA, S.A., Montcada I Reixac (ES)

( * ) Notice: Subject to any disclaimer, the term of this patent is extended or adjusted under 35 U.S.C. 154(b) by 0 days.

(21) Appl. No.: 17/260,748

(22) PCT Filed: Jul. 16, 2018

(86) PCT No.: PCT/ES2018/070506
§ 371 (c)(1),
(2) Date: Jan. 15, 2021

(87) PCT Pub. No.: WO2020/016426
PCT Pub. Date: Jan. 23, 2020

(65) Prior Publication Data
US 2021/0262246 A1 Aug. 26, 2021

(51) Int. Cl.
*F16M 11/00* (2006.01)
*E04G 21/32* (2006.01)
(Continued)

(52) U.S. Cl.
CPC ........ *E04G 21/329* (2013.01); *A62B 35/0068* (2013.01); *A62B 35/04* (2013.01)

(58) Field of Classification Search
CPC .............. E04G 21/329; E04G 21/3276; A62B 35/0068; A62B 35/04
See application file for complete search history.

(56) References Cited

U.S. PATENT DOCUMENTS 4,171,032 A * 10/1979 Woolslayer ............ A62B 35/04 182/3
4,607,724 A 8/1986 Hillberg
(Continued)

FOREIGN PATENT DOCUMENTS

EP 1 400 642 B1 4/2008
EP 3 002 044 A1 4/2016
(Continued)

OTHER PUBLICATIONS

International Search Report for PCT/ES2018/070506 dated Apr. 11, 2019 [PCT/ISA/210].

*Primary Examiner* — Amy J. Sterling
(74) *Attorney, Agent, or Firm* — Sughrue Mion, PLLC

(57) ABSTRACT

A fall protection device for a user working on horizontal surfaces in construction sites, which can adopt two end positions: an operating protection position and a non-operating storage position. The device has a mast releasably couplable at the lower end to a fixed element of the construction with the possibility of pivoting on its own vertical shaft; an arm at a first end of an articulated joint articulated with the end of the upper portion of the mast, the second end thereof being free and the arm configured to receive in an area of the second end the coupling of fastening and attachment for the user; a strut with a first end articulately joined to the arm and with a second end to be fastened on a point of the upper portion of the mast under the end of the upper portion where the mast is articulated with the arm.

19 Claims, 4 Drawing Sheets

(51) Int. Cl.
*A62B 35/00* (2006.01)
*A62B 35/04* (2006.01)

(56) References Cited

U.S. PATENT DOCUMENTS

| | | | | |
|---|---|---|---|---|
| 9,744,386 | B2 * | 8/2017 | Baughman | F16M 11/42 |
| 10,347,109 | B2 * | 7/2019 | Troy | B66F 11/044 |
| 2012/0193165 | A1 * | 8/2012 | Vetesnik | A62B 35/04 182/3 |
| 2012/0312940 | A1 | 12/2012 | Julliard | |
| 2014/0008511 | A1 * | 1/2014 | Xammar Bove | A62B 35/04 248/636 |
| 2014/0090927 | A1 * | 4/2014 | Patton | A62B 35/005 182/112 |

FOREIGN PATENT DOCUMENTS

| | | | |
|---|---|---|---|
| JP | 2004-092093 | A | 3/2004 |
| WO | 2004/104326 | A1 | 12/2004 |

* cited by examiner

FALL PROTECTION DEVICE

CROSS REFERENCE TO RELATED APPLICATIONS

This application is a National Stage of International Application No. PCT/ES2018/070506 filed Jul. 16, 2018.

TECHNICAL FIELD OF THE INVENTION

The present invention relates to a fall protection device for coupling a user working on horizontal surfaces in construction sites to a fixed element of the construction. The device is of the type of devices comprising fastening and attachment means for an operator to a fixed element of the construction, which includes a harness or safety belt and a carabiner, as well as anchoring means that link the device to said fixed element of the construction. The fall protection device is capable of adopting two end positions, the first being an operating protection position and the second being a non-operating storage position and essentially comprises a mast, an arm articulated at the upper portion of the mast and a shock-absorbing strut arranged, in the operating protection position, between the upper portion of the mast and the articulated arm.

BACKGROUND OF THE INVENTION

One of the most frequent risks in the construction sector in work carried out high up is that of falls, particularly that applying to the case of formwork preparation for horizontal surfaces, slabs, level beams, etc.

A good number of systems are known in the form of individual protection equipment which have been envisaged to avoid risks in this type of work, such as fastening an operator to a fixed element through a harness or safety belt and joined by means of a carabiner to one end of a rope of limited length linked to the fixed element by its opposite end.

By way of collective protection equipment, devices are known which frequently include a netting that wholly or partially surrounds the perimeter of the horizontal surface which is being worked on.

The individual protection equipment consisting of currently known harnesses have the disadvantage that, while they prevent the fall, they excessively limit the operator's movement. As far as equipment based on netting is concerned, it suffers from the drawback of not preventing the fall, being limited to avoiding falls to the ground and it seldom avoids blows and knocks to the person who falls.

Patent document EP1400642-B1 describes a safety device for work on horizontal surfaces in construction sites, wherein the anchorage means are made up of an anchorage element, suitable for being inserted into a mass of concrete or mortar in a fluid state and remaining solidified to the same after the setting or hardening of said mass. The safety device is essentially characterised in that joining means for joining fastening means to anchorage element are made up of a mast releasably connected by its lower portion to said anchorage element with the possibility of pivoting on its vertical axis, and joined, by its upper portion to the upper end of a rope which, at its lower end is linked to said fastening means, the rope being able to turn with respect to the vertical axis of the mast, in such a way that the operator remains firmly fastened with the possibility of moving freely within an essentially circular field of action, around said vertical axis. Preferably, the anchorage element is a sleeve which receives in its interior the lower end of the mast with the possibility of pivoting on its vertical axis. Said sleeve has an inverted truncated cone shape and comprises a perimeter rim envisaged for resting on the outer surface of the mass of concrete or mortar, offering the possibility of recuperating it after use. Alternatively, the anchorage element can be a solid block fitted with an upper rod which projects from the mass of concrete or mortar and which receives the coupling from a hollow tubular lower portion of the mast, with the possibility of turning about its vertical axis.

According to an embodiment of the joining means of the safety device object of patent document EP1400642-B1, said joining means further comprise an upper turning member, joined to the mast, with the possibility of turning with respect to the latter on its vertical axis. It is envisaged that said upper turning member comprises a turning arm into the free end of which is fixed the upper end of the rope. The device may comprise an arm fitted with a fixed or moveable compensating ballast in the opposite end of the turning arm. Preferably, the rope comprises energy absorbing means, adapted for preventing the operator from suffering an impact by the jerking of the rope in the event of an accidental fall.

Although said device is a major step forward in the safety of workers in construction sites, by providing workers with greater freedom of movement around the mast, the mounting thereof entails great effort due to the fact that the components of the safety device are heavy elements as a whole, which are normally made from steel, and big, which means that a crane must be available in order to lift the safety device, which for example has been mounted resting on the ground, and place it in the sleeve inserted in the set concrete.

Another example of a device is that of the patent application EP3002044-A1, which discloses a fall protection system for securely coupling a user to a support structure. The fall protection system comprises a mast arranged to be vertically mounted in a state of use, having a top end and a base end; a user connection assembly; and a tether connector; wherein the mast comprises a structure connection portion, at which the mast is arranged to be releasably connected to the support structure, and an energy absorbing deformation portion positioned closer to the top end than the structure connection portion. The fall protection system is rearrangeable between an inactive state and a ready-to-use state. In the ready-to-use state, the user connection assembly protrudes from the mast substantially radially from the mast, and has a proximal end, connected with the mast at the top end, and a distal end. The tether connector is arranged at the user connection assembly, and the energy absorbing deformation portion is arranged to deform when a bending force is exerted caused by a falling user tethered to the tether connector. Thereby, the energy absorbing deformation portion absorbs energy and reduces the force exerted on the mast at its structure connection portion.

The mounting of this fall protection system is shown in FIGS. 6a to 6c of the patent application EP3002044-A1. The advantage it provides is that the system is ready to mount, with the components thereof assembled and can be stored in a small space in the inactive state. However, as can be seen in said figures, the user connection assembly, which is the part that acquires a triangular shape coupled to the top portion of the mast in the ready-to-use position, has quite a considerable length as it has to be unfolded from the inactive state position in order to mount the system, and before reaching the ready-to-use position it must be folded, but this time in the opposite direction to the prior unfolding. Although the system, in theory, can be placed with the lower end of the mast inserted in the structure in the inactive position and the different parts be unfolded and folded in order to adopt the ready-to-use position, placing the mast vertically still requires a crane due to the weight of the assembly and due to the height of the mast itself, it is difficult for an operator, if they are not standing on anything, to carry out the unfolding and folding operation. As such, in practice, the operators rest the system on the surface of the work site and carry out the operations by unfolding and folding the parts of the user connection assembly and once the triangle is mounted on the mast, they lift it and place it in the operating position, with the mast vertical. Said unfolding and folding entails the need to have a large space and this is sometimes difficult in construction sites, and more so if the work is carried out at the ends of formwork or on cantilevers, where there lacks space to rest the system and mount it before lifting it to put the mast in a vertical position.

Therefore, the aim of the present invention is to disclose an alternative to this known equipment, the purpose of which is to provide a device of the type cited that does not have such drawbacks, which is easy to install and the use of which is very comfortable and simple, without requiring considerable space for the mounting there of in a work site.

DESCRIPTION OF THE INVENTION

In order to provide a solution to the aforementioned needs, a fall protection device for coupling a user working on horizontal surfaces in construction sites to a fixed element of the construction is disclosed. The fall protection device object of the present invention is able to adopt two end positions, the first being an operating protection position and the second being a non-operating storage position.

The fall protection device object of the invention comprises:

- a mast, intended to be arranged vertically in the operating protection position, having an upper portion and a lower portion, wherein the lower portion of the mast is releasably couplable to a fixed element of the construction with the possibility of pivoting on its own vertical axis;
- an arm, intended to be arranged horizontally in the operating protection position forming an inverted L with the mast, being provided at a first end with an articulated joint that is articulated with the end of the upper portion of the mast, the second end thereof being a free end and the arm being configured to receive in an area of the second end the coupling of fastening and attachment means for the user;
- a shock-absorbing strut to cushion the pivotal movement of the arm towards the mast caused by a downward traction force occasionally applied at an area of the end of the arm by the fastening and attachment means for the user, the strut being provided with a first end joined articulately to the arm and a second end intended to be fastened, in the operating protection position, on a point of the upper portion of the mast under the end of the upper portion where the mast is articulated with the arm.

The fall protection device object of the present invention is characterised in that the articulation of the first end of the strut with the arm is a sliding articulation that can slide along the arm.

According to another characteristic of the fall protection device of the invention, the arm is provided with a limit stop element to limit the sliding of the articulation of the first end of the strut with the arm, located between said articulation and the second end of the arm. Furthermore, the mast comprises releasable joining means for the releasable fastening of the second end of the strut, fixedly arranged on the upper portion of the mast on a point such that in the operating protection position, the second end of the strut is joined to the mast by said releasable joining means and the first end of the strut is in a position corresponding to that of the stop of the articulation with the stop element.

In accordance with another characteristic of the fall protection device of the invention, in the second non-operating storage position, the mast, arm and strut are arranged parallel to each other and with the strut flanked by the mast and the arm, the first end of the arm being articulately joined to the end of the upper portion of the mast, and the first end of the strut also being articulately joined with the arm by the articulation.

According to another characteristic of the fall protection device of the invention, the releasable joining means of the mast for the releasable fastening of the second end of the strut project from the rest of the mast in a direction perpendicular to the same sufficiently to abut against the articulation of the first end of the strut with the arm when the fall protection device is in the second non-operating storage position, wherein said articulation is arranged between the articulated joint of the first end of the arm with the end of the upper portion of the mast and the releasable joining means with which the articulation abuts.

In line with the above characteristic, the releasable joining means of the mast for the releasable fastening of the second end of the strut preferably comprise a pin and a U-shaped bracket or fork around the mast. Said bracket or fork is configured by parallel extensions that are separated from each other by a distance for receiving between the same the second end of the strut in the operating protection position and for receiving between the same the first end of the strut in the non-operating storage position. Moreover, the extensions have respective through holes suitable for the passage therethrough of said pin with the interposition of the second end of the strut between the extensions in the operating position, the second end of the strut being likewise provided with through holes for the passage therethrough of the pin.

Additionally and advantageously, the apical ends of the extensions of the U-shaped bracket or fork are separated from each other by a distance for receiving between the same, in the non-operating storage position, a section of the arm that is provided with a locking through hole for storage. The apical ends of the extensions have secondary through holes suitable for the passage therethrough of a pin with the interposition of said section of the arm between the apical ends of the extensions in the non-operating storage position. This pin may be the same that is indicated to pass through the through holes of the extensions, as mentioned in the previous paragraph, such that the same pin can be used so that the fall protection device adopts the operating protection position and so that it can later adopt the non-operating storage position when it is no longer necessary to carry out the work requiring the fall protection of workers at the construction site (users of the device object of the present invention).

According to another characteristic of the fall protection device object of the invention, it further comprises hoisting hook-up means fixedly arranged on the arm between the articulated joint of the first end of the arm with the end of the upper portion of the mast and the articulation of the first end of the strut with the arm. These hoisting hook-up means can be configured, for example, as a handle fixedly welded or joined to the arm, which enables the hoisting of the fall protection device by means of a hook of a crane or similar device, essentially arranged over the centre of gravity of the fall protection device.

In accordance with a preferred embodiment of the fall protection device object of the invention, the strut comprises a female portion and a male portion extending into an opening formed at the female portion, wherein the female portion and the male portion have the ability to cooperate and slide with respect to each other at the level of the opening when a compression force is transmitted to the first end of the strut. The female portion is provided with housings for respective cylindrical or spherical elements that roll or rotate due to friction with the male portion when the female and male portions slide with respect to each other, the dimensions of said elements being such that they interfere with the outer profile of the male portion, pressing and causing the successive plastic deformation of the male portion during its movement relative to the female portion.

According to this preferred embodiment, the male and female portions of the strut further respectively have an inner tubular section and an outer tubular section, which are concentric and intended to slide into one another.

In fact, this preferred embodiment envisages that the strut is the strut described in patent application US 2014/0008511-A1, referenced in said document by the number 4 and the content of which is incorporated by reference into the present patent application.

According to another characteristic of the fall protection device object of the invention, the device comprises anchoring means that comprise an anchoring element inserted into a mass of concrete or mortar in a fluid state, and remaining solidified to the same after the setting or hardening of said mass. Said anchoring means link the fall protection device to the fixed element of the construction, and the mast is movably coupled by its lower portion to said anchoring element with the possibility of pivoting on its vertical axis, in such a way that the user remains firmly fastened with the possibility of moving freely within an essentially circular field of action, around said vertical axis of the mast. Preferably, the anchoring element is a sleeve which receives in its interior the lower portion of the mast with the possibility of pivoting on its vertical axis. Also preferably, it is envisaged that the lower end of the lower portion of the mast has a cylinder-shaped apical section followed by an inverted truncated cone section, similarly to the sleeve, which is also intended to have a cylinder-shaped apical section followed by an inverted truncated cone section corresponding to the lower end of the mast.

In accordance with the preferred embodiment of the fall protection device object of the invention, the mast has a cylindrical tubular section with the exception of a portion adjacent to the apical section of the lower end of the mast, which is an inverted truncated cone section. According to another characteristic of the preferred embodiment, the arm and strut are formed by profiles with rectangular or square tubular cross sections.

Advantageously, it is envisaged that the mast, arm and strut are formed by tubular profiles made of aluminium or an aluminium alloy. In this way, the fall protection device is very light compared to other fall protection devices and, as a result of the configuration thereof, it enables a user to mount the device in the construction site on their own, or at most, with the help of another colleague, without needing to use a crane to place the lower end of the mast in the sleeve or in the housing of the structure under construction intended to receive said end.

As indicated above, the fall protection device object of the present invention is characterised in that the articulation of the first end of the strut with the arm is a sliding articulation that may slide along the arm. There are several embodiments of the fall protection devices, citing for example a first one wherein the articulation of the first end of the strut with the arm forms part of a sliding carriage configured as a tubular case with open ends and movable along the arm and arranged around a section of said arm. Taking into account that the arm preferably has a rectangular or square cross section, the sliding carriage shall be configured as a tubular portion with open ends likewise with a rectangular or square transverse cross section, with a hollow that is slightly larger than that of the cross section of the arm precisely so that the tubular case can slide on the arm. According to another alternative embodiment, the articulation of the first end of the strut with the arm is configured as a groove made along at least one section of the arm and a pin that may slide along said groove, said pin being coupled to the first end of the strut. These are two possible embodiments of the articulation that can slide along the arm, although other similarly valid options for forming said articulation that can slide in accordance with the other characteristics that define the fall protection device object of the present invention are not excluded.

BRIEF DESCRIPTION OF THE DRAWINGS

As a complement to the description provided herein, and for the purpose of helping to make the characteristics of the fall protection device of the invention more readily understandable, this specification is accompanied by a set of drawings which, by way of illustration and not limitation, represent the following.

DETAILED DESCRIPTION OF THE INVENTION

Figure 1:
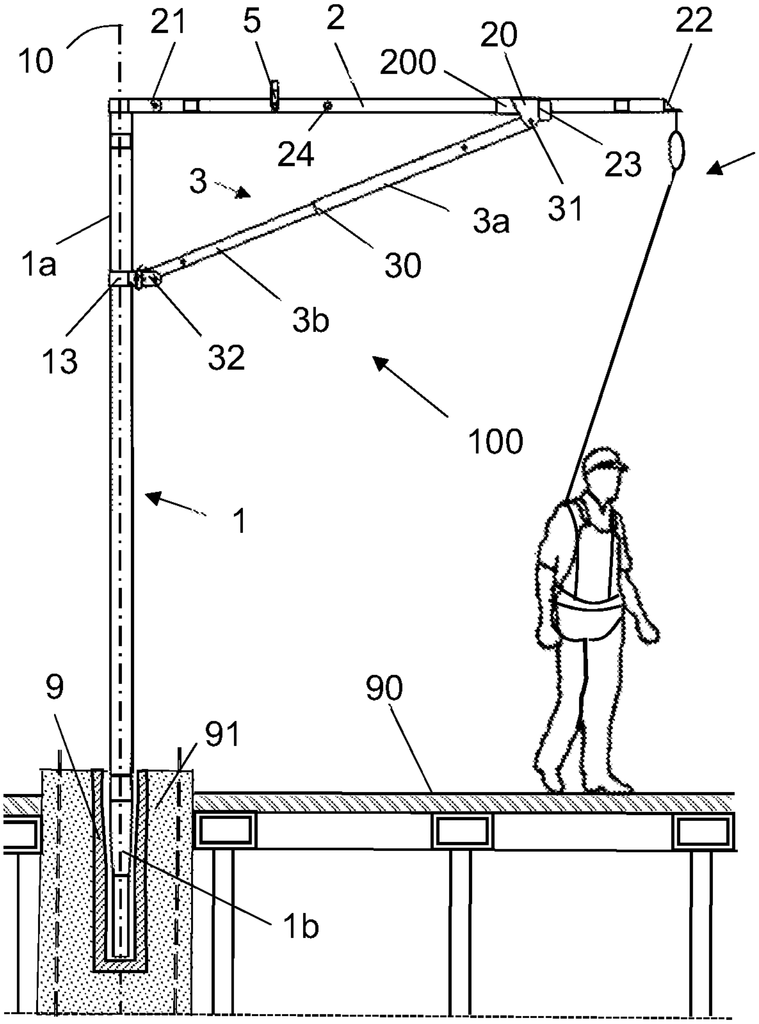
FIG. 1 is an elevation view showing a preferred embodiment of the fall protection device according to the invention, in the operating protection position, in turn showing the user that the device protects and showing the device placed in the fixed element of the construction.

FIG. 1 illustrates the fall protection device 100 object of the present invention for coupling a user (shown only in FIG. 1) working on horizontal surfaces 90 in construction sites to a fixed element of the construction. The device is especially intended to prevent fall accidents from high up in construction sites, especially applicable to the case of formwork preparation for horizontal surfaces 90 of slabs, level beams, etc. at the same time providing operators with a relatively large field of action, having great freedom of movement. The fixed element of the construction can be, for example, a column 91 or pillar concreted to the level of the formwork of the slab on which the operator (the user of the fall protection device 100) must work.

Figure 2:
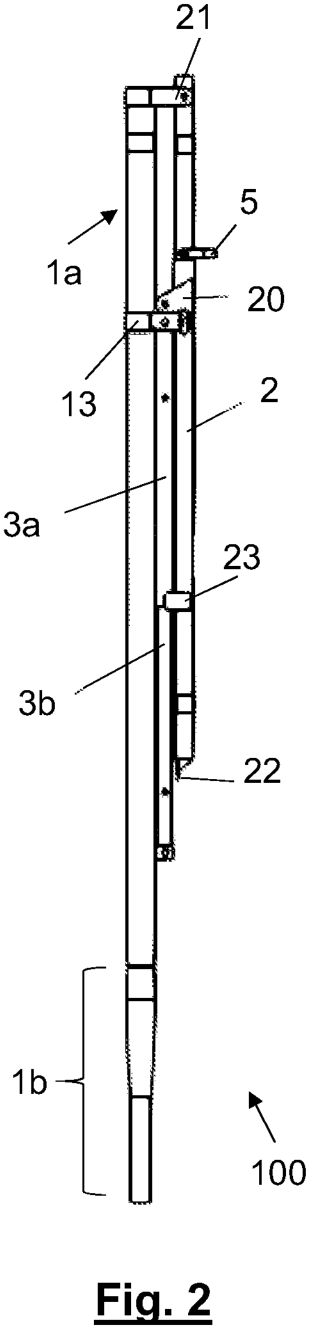
FIG. 2 is an elevation view of the fall protection device shown in FIG. 1 but this time shown in the non-operating storage position and not showing the fastening and attachment means for the user.

This fall protection device 100 is capable of adopting two end positions, the first being an operating protection position, which is shown in FIG. 1, and the second being a non-operating storage position, shown in FIG. 2. As may be seen in the figures, the fall protection device 100 essentially comprises a mast 1, an arm 2 and a strut 3 that shall be discussed in detail below. Advantageously, the mast 1, arm 2 and strut 3 are manufactured with tubular profiles made of an aluminium alloy, which enables the fall protection device 100 to be placed and handled in work sites by an operator without needing the intervention of any crane-type machinery or lifting mechanism. Furthermore, as shall be seen below, a large space in order to change from the non-operating storage position to the operating protection position is not necessary.

The mast 1 is intended to be arranged vertically in the operating protection position (FIG. 1), and therein an upper portion 1*a* and a lower portion 1*b* can be identified, the lower portion 1*b* being releasably couplable to a fixed element of the construction, such as a column 91 with the possibility of pivoting on its vertical axis 10. The fall protection device 100 comprises anchoring means that in turn comprise an anchoring element 9 inserted into a mass of concrete or mortar in a fluid state, and remaining solidified to the same after the setting or hardening of said mass. The anchoring means link the fall protection device 100 to the fixed element of the construction (represented by the column 91). In FIG. 1, the anchoring element 9 is made up of a hollow sleeve which receives in its interior the lower end of the lower portion 1*b* of the mast 1, and said end having been inserted, the mast 1 is capable of pivoting about its vertical axis 10, enabling the user to remain firmly fastened with the possibility of moving freely within an essentially circular field of action, around said vertical axis 10. The coupling of the mast 1 to the anchoring element 9 (sleeve) is a releasable coupling, which enables the insertion and removal of the lower end of the mast 1.

The hollow sleeve represented in FIG. 1 has an inverted truncated cone shape and is inserted in the upper end of the concrete. The sleeve can have an upper perimeter rim for resting on the mass of concrete.

The mast 1 is essentially configured by a tubular profile with a cylindrical cross section, with the exception of a section of the lower portion 1*b* that comprises a truncated cone section. In particular, it can be seen in FIGS. 1 and 2 that the apical section of the lower portion 1*b* has a cylindrical configuration, that is, with a diameter somewhat smaller than the cylindrical section of the upper portion 1*a* of the mast 1. After this apical section, the lower portion 1*b* has an inverted truncated cone section, followed by a cylindrical section with practically the same diameter as that of the rest of the mast 1. As for the sleeve constituting the anchoring element 9, it is formed by sections which shape corresponds to that of the lower portion 1*b* intended to be inserted in the cavity thereof (FIG. 1). It must be noted that the inverted truncated cone favours the guiding and insertion of the mast 1 into the sleeve so that it is in a vertical position, prepared to change from the non-operating storage position to the operating protection position.

Other variants of anchoring element, such as for example one that is made up of a solid block that is inserted into the concrete mass in fluid state poured in a formwork for columns, are not ruled out. The block can have an upper rod that projects from the mass of concrete and that is adapted to receive, with the possibility of rotating about the vertical axis 10, a hollow tubular lower portion of the mast 1.

Figure 8:
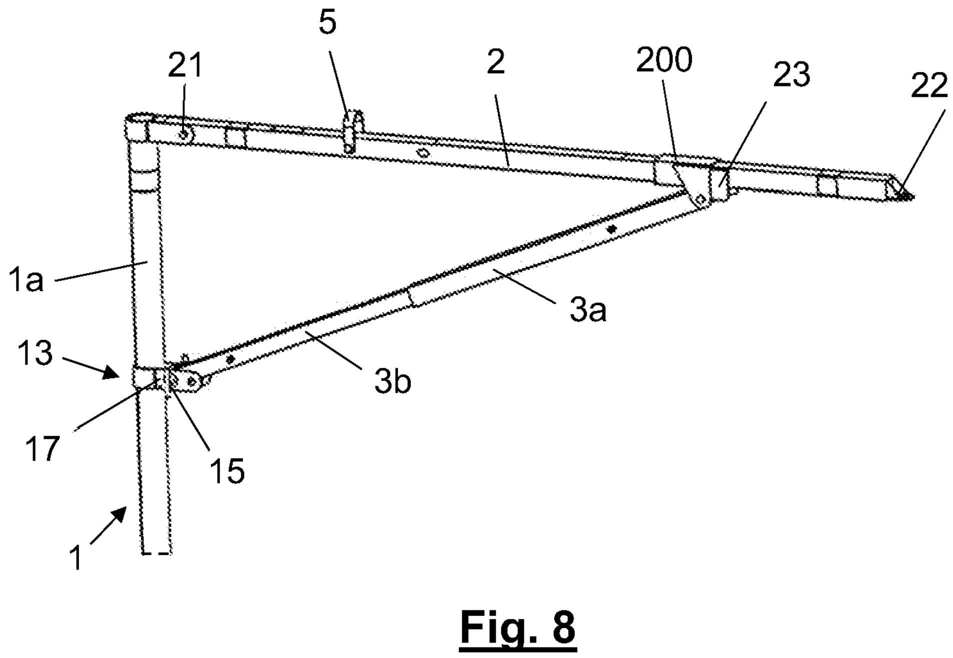

Another component of the fall protection device 100 is the arm 2, made up of a tubular profile with an essentially square or rectangular cross section, that is intended to be arranged horizontally in the operating protection position forming an inverted L with the mast 1, as shown in FIGS. 1 and 8 wherein the mast 1 and the arm 2 are arranged perpendicular to each other. The arm 2 has at a first end an articulated joint 21 that is articulated with the end of the upper portion 1*a* of the mast 1, while the second end 22 thereof is a free end, and in fact, it is at this free end where the fastening and attachment means 4 for the user, which include a rope, harness or safety belt and carabiner, are coupled. The configuration of the articulated joint 21 enables the mutual rotation of the mast 1 with the arm 2 about the vertical axis 10. It shall be the user, linked by the fastening and attachment means 4 to the second end 22 of the arm, who causes due to their movement, the rotation of the arm 2 and, therefore, the rotation of the mast 1 with respect to the fixed element of the construction and the anchoring element fastened in the same.

The third component, the strut 3, acts as a shock-absorber of the pivoting movement of the arm 2 towards the mast 1 caused by the downward traction force occasionally applied in an area of the end of the arm 2 by the fastening and attachment means 4 for the user. The strut 3 is provided with a first end 31 articulately joined to the arm 2 and with a second end 32 intended to be fastened, in the operating protection position, on a point of the upper portion 1*a* of the mast 1 under the end of the upper portion 1*a* where the mast 1 is articulated with the arm 2.

Figure 3:
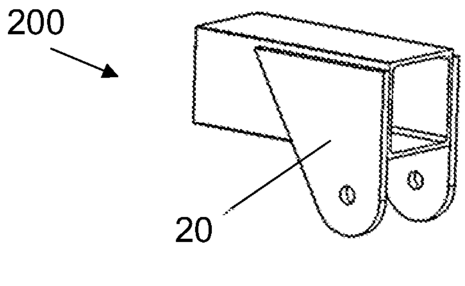
FIG. 3 shows a sliding carriage configured as a tubular case with open ends of which the articulation of the first end of the strut with the arm of the fall protection device shown in FIG. 1 forms part.

It is noteworthy that the articulation 20 of the first end 31 of the strut 3 with the arm 2 is a sliding articulation, an articulation that can slide along the arm 2. In the drawings provided, and in detail in FIG. 3, the articulation 20 forms part of a sliding carriage 200 configured as a tubular case with open ends and movable along the arm 2 and arranged around a section of said arm 2.

However, there are other ways of configuring the articulation 20 so that it may slide along the arm 2, for example, being formed by a groove made along at least one section of the arm 2 and by a pin that may slide along said groove, said pin being coupled to the first end 31 of the strut 3. This solution has not been shown in the drawings.

The articulation 20 enables the rotation according to an axis perpendicular to the plane on which the mast 1, arm 2 and strut 3 are arranged. Said rotation axis is parallel to the rotation axis of the articulated joint 21 and also parallel to the imaginary line that would link the through holes 15 and the secondary through holes 16 of extensions 14 that shall be described below.

It can be seen in FIGS. 1 and 2-8 that the arm 2 is provided with a limit stop element 23 to limit the sliding of the articulation 20 of the first end 31 of the strut 3 with the arm 2. The limit stop element 23 is fixedly joined to the tubular profile that constitutes the arm 2 and is located between said articulation 20 and the second end 22 of the arm 2. The limit stop element 23 has been represented in these figures as a plate welded to the lateral face of the tubular profile with a rectangular or square cross section that constitutes the arm 2. Said plate projects slightly from said face, thus preventing the articulation 20 located in the sliding carriage 200 from continuing to slide. The sliding of the articulation 20 can be seen in the sequence of FIGS. 5 to 7 and FIG. 8 is when the articulation 20 is prevented from moving along the arm 2 towards the second end 22 as it abuts against the limit stop element 23. In fact, the moment in which the articulation 20 abuts, marks the moment in which the second end 32 of the strut can be fixedly coupled on a point of the upper portion 1 of the mast 1, specifically on releasable joining means 13 provided in said upper portion 1*a*.

It can be seen in FIGS. 4 to 8 how the mast 1 comprises releasable joining means 13, as mentioned above, for the releasable fastening of the second end 32 of the strut 3. The releasable joining means 13 are fixedly arranged on the upper portion 1*a* of the mast 1 on a point such that in the operating protection position, the second end 32 of the strut 3 is joined to the mast 1 by said releasable joining means 13 and the first end 31 of the strut 3 is in a position corresponding to that of the stop of the articulation 20 with the stop element 23. Thus, the user of the device, upon manipulating the fall protection device 100 so that it adopts the operating protection position, only has to worry about pulling the strut 3 making the upper end 31 thereof slide, as it is articulated by the articulation 20, along the arm 2 until it abuts with the stop element 23 and at this moment the second end 32 of the strut can be brought closer to the releasable joining means 13 in order to fasten it to the mast 1 (as indicated by the bold arrow in FIG. 7 to reach the position of FIG. 8).

Figure 4:
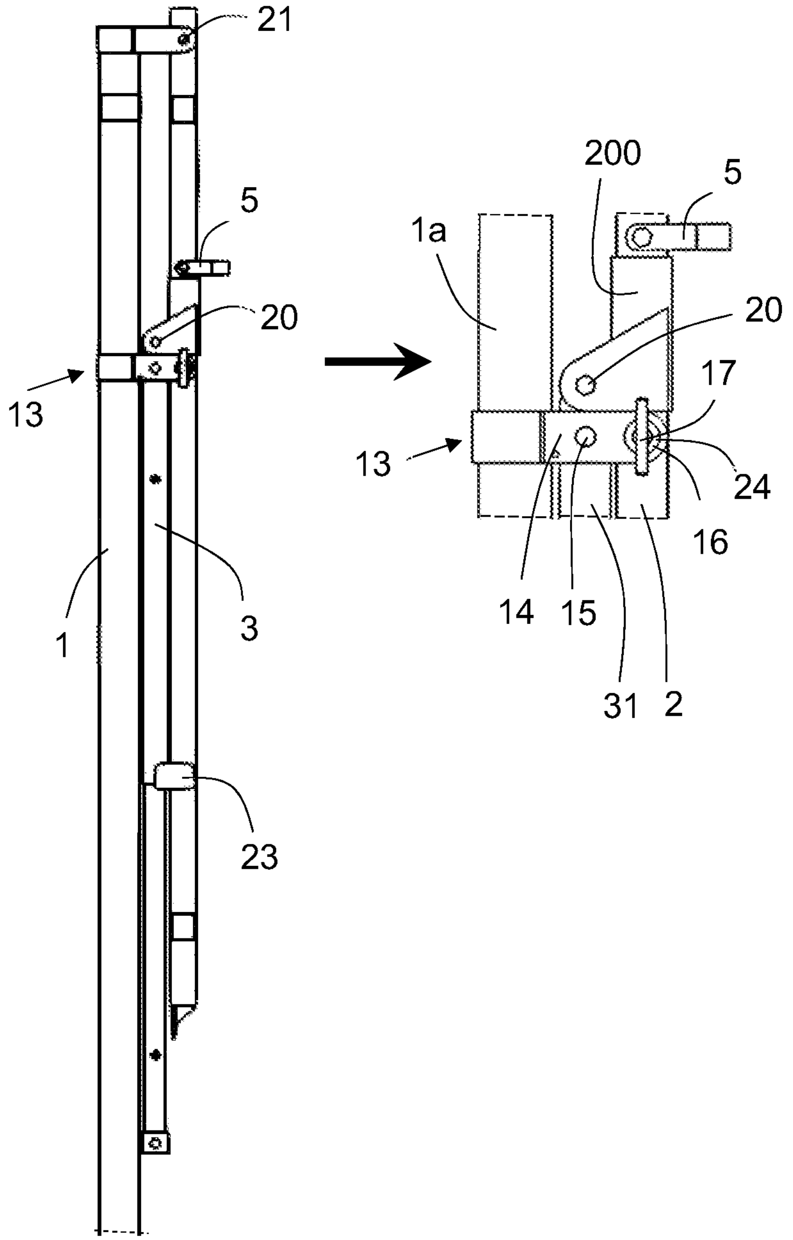
FIG. 4 is an expanded view of part of the fall protection device shown in FIG. 2 wherein a more expanded detailed view of the releasable joining means of the mast for releasably fastening the second end of the strut is shown.

In the expanded detailed view of FIG. 4, it can be seen that the releasable joining means 13 project from the rest of the mast 1 in a direction perpendicular to the same sufficiently to abut against the articulation 20 of the first end 31 of the strut 3 with the arm 2 when the fall protection device 100 is in the second non-operating storage position. In the non-operating storage position, the mast 1, arm 2 and strut 3 are arranged parallel to each other and with the strut flanked on one side by the mast 1 and on the other side by the arm 2, the first end of the arm 2 being articulately joined to the end of the upper portion 1*a* of the mast 1, and the first end 31 of the strut 3 also being articulately joined to the arm 2 by the articulation 20. It can be seen in FIG. 4 how in said non-operating position, the articulation 20 is arranged between the articulated joint 21 of the first end of the arm 2 with the end of the upper portion 1*a* of the mast 1 and the releasable joining means 13 with which the articulation 20 abuts. This characteristic is very useful in practice because it means that in the non-operating position the articulation 20 does not slide downwards (if the mast 1 is in a vertical or almost vertical position) due to gravity and thus the strut 3 is retained in a position wherein it does not project too much from the length of the arm 2 and wherein the second end 32 thereof does not come close to the lower portion 1*b* of the mast 1 and, therefore, there is no possibility of it dragging.

The releasable joining means 13 represented (represented in FIGS. 4 and 7) comprise a pin 17 and a U-shaped bracket or fork around the mast 1. This bracket or fork is formed by a bridge joining two extensions 14 (in the form of lugs or tabs) that are parallel and separated from each other by a distance for receiving between the same the second end 32 of the strut 3 in the operating protection position and for also receiving between the same extensions 14 at the first end 31 of the strut 3 in the non-operating storage position.

The extensions are equipped with respective through holes 15 suitable for the passage therethrough of said pin 17 with the interposition of the second end 32 of the strut 3 between the extensions 14 in the operating position. As for the second end 32 of the strut 3, it is likewise provided with through holes for the passage therethrough of the pin 17 so that the strut 3 is coupled to the mast 1 in order to adopt the operating protection position (see FIG. 8).

In addition to the foregoing, the apical ends of the extensions 14 are separated from each other by a distance for also receiving between the same, in the non-operating storage position, a section of the arm 2 that is provided with a locking through hole for storage 24 (represented in FIG. 1 and in the expanded detailed view of FIG. 4). The apical ends of the extensions 14 have secondary through holes 16 suitable for the passage therethrough of a pin 17 with the interposition of said section of the arm 2 between the apical ends of the extensions 14 in the non-operating storage position. In the detailed view of FIG. 4, the locking through hole for storage 24 is superimposed between the two secondary through holes 16. The pin 17 that is used to keep the mast 1, arm 2 and strut 3 in the folded position wherein they are in the non-operating storage position, can be the same pin 17 that will later be used to couple the second end 32 of the strut to the upper portion 1*a* of the mast 1 in the operating protection position (the pin 17 of FIG. 8). While the non-operating storage position is changed to the operating protection position, the pin 17 can hang from the bracket of the releasable joining means 13 by a chain or string fastened to the bracket to prevent the pin 17 from being lost while it is not passed through any through hole.

Additionally, the fall protection device 100 may comprise hoisting hook-up means 5 fixedly arranged on the arm 2 between the articulated joint 21 of the first end of the arm 2 with the end of the upper portion 1*a* of the mast 1 and the articulation 20 of the first end 31 of the strut 3 with the arm 2. These hoisting hook-up means 5 can be configured, for example, as a handle fixedly welded or joined to the arm 2, which enables the hoisting of the fall protection device 100 by means of a hook of a crane or similar device, essentially arranged over the centre of gravity of the fall protection device 100, in the event that the fall protection device 100 must be moved, for example if it must be moved from the ground where the work site is located to the formwork of a slab at a level higher than the ground or the devices must be removed when they are no longer needed.

With respect to the strut 3, in the preferred embodiment shown in the drawings, it comprises a female portion 3*a* and a male portion 3*b* extending into an opening 30 formed at the female portion 3*a*. The female portion 3*a* and the male portion 3*b* have the ability to cooperate and slide with respect to each other at the level of the opening 30 when a compression force is transmitted to the first end 31 of the strut 3. The female portion 3*a* is provided with housings for respective cylindrical or spherical elements that roll or rotate due to friction with the male portion 3*b* when the female 3*a* and male 3*b* portions slide with respect to each other, the dimensions of said elements being such that they interfere with the outer profile of the male portion, pressing and causing the successive plastic deformation of the male portion 3*b* during the relative movement thereof with respect to the female portion 3*a*. The male 3*b* and female 3*a* portions respectively have an inner tubular cross section and an outer tubular cross section, which are concentric and intended to slide one inside the other. In fact, this preferred embodiment envisages that the strut 3 of the present invention has the characteristics of the strut described in patent application US 2014/0008511-A1, referenced in said document by the number "4".

Below a brief description of how a user must mount and use the fall protection device 100 is provided. Firstly, it must be assumed that the device will be stored in a non-operating storage position such as that shown in FIG. 2. Obviously in said non-operating position, the mast 1, arm 2 and strut 3 do not have to be arranged vertically, but they can be piled on the ground and be placed horizontally. They will be arranged parallel to each other and with the strut flanked by the mast 1 and the arm 2, the first end of the arm 2 being articulately joined to the end of the upper portion 1*a* of the mast 1, and the first end 31 of the strut 3 also being articulately joined to the arm 2 by the articulation 20. The pin 17 shall be inserted passing through the secondary through holes 16 of the extensions 14 and the locking through holes for storage 24 of the arm 2. It is also supposed that the construction site already has the anchoring element fixedly anchored or joined to the fixed element of the construction, that is, that the sleeve will already be inserted in the hardened concrete of the column 91. The fall protection device 100 will have been moved by a crane (hooking it by the hoisting means 5) and taken to the horizontal surface 90 until it rests on the same.

Based on this situation, the user, if he/she is strong enough, no more than what is required of a construction worker, lifts the fall protection device 100 and moves it to the sleeve, inserting the lower portion 1*b* of the mast 1 into the cavity of the sleeve. The fall protection device 100 would be in the position represented in FIG. 2, with the mast 1 in a vertical position, inserted by the lower end of the anchoring element 9 (sleeve) of FIG. 1. In this position it is recommended that the user places at least part of the fastening and attachment means 4 at the second end 22 of the arm 2, since later on it can be more difficult to hang them from the arm 2 because the latter will be at a greater height, being harder to reach by the user. The fastening and attachment means 4 have not been represented in FIGS. 5 to 8 but they would be placed at the second end 22 or close to the same in a preset location on the arm 2.

Figure 5:
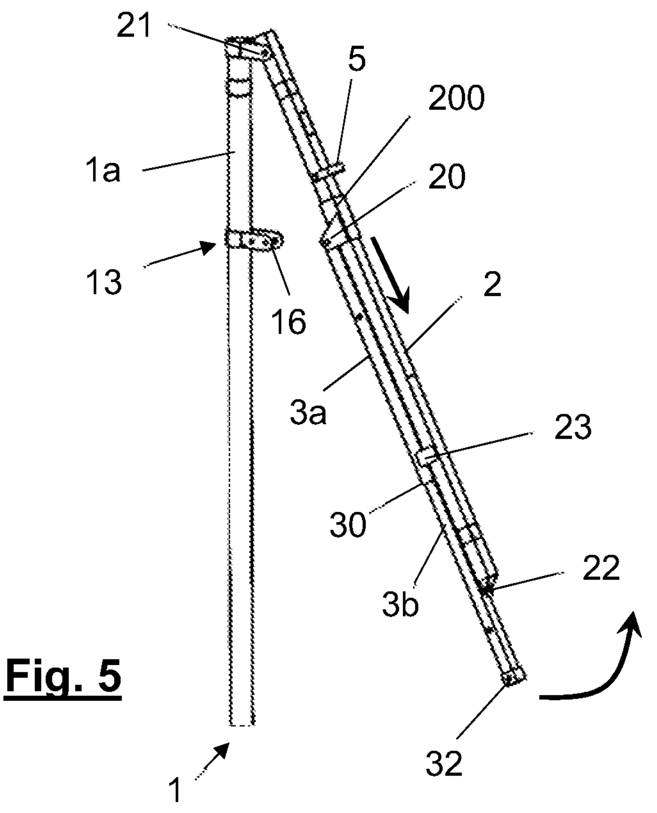
FIGS. 5 to 8 are partial perspective views of the protection device shown in FIG. 2 to illustrate the various intermediate positions of said device to change from the end non-operating storage position (FIG. 2) to the end operating protection position (FIG. 1), FIG. 8 being the partial view corresponding to said operating position but shown before placing the fastening and attachment means for the user.

Immediately thereafter, the user removes the pin 17 from the secondary through holes 16 and leaves it hanging, meaning that the arm 2 is no longer linked to the releasable joining means 13 and can rotate about the articulated joint 21 (rotation axis parallel to the imaginary line that would join the secondary through holes 16) in the direction shown by the bold arrow of FIG. 5. This rotation takes place when the user simply holds the second end 32 of the strut and moves it, separating it from the mast 1, which would describe an imaginary circular trajectory with the centre being the articulated joint 21. In this situation, having removed the pin 17, and slightly rotated the strut 3, the articulation 20 of the first end 31 of the strut 3 with the arm 2 is no longer prevented by the stop that the extensions 14 provided from sliding towards the second end 22 of the arm, and due to gravity, tends to slide downwards, towards said second end 22. This sliding has also been shown in FIG. 5 by a straight bold arrow parallel to the arm 2.

Figure 6:
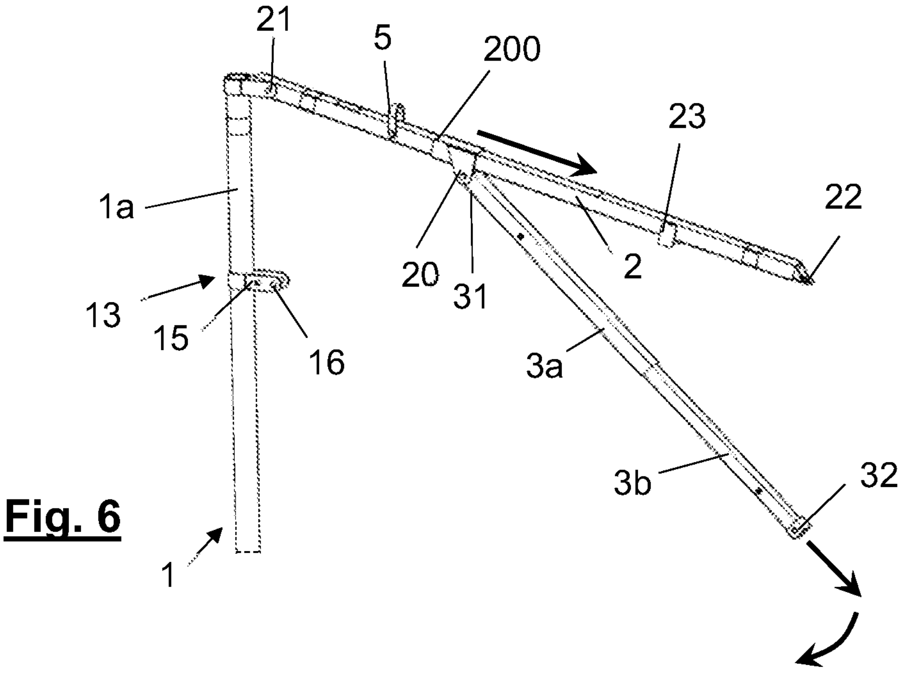
Figure 7:
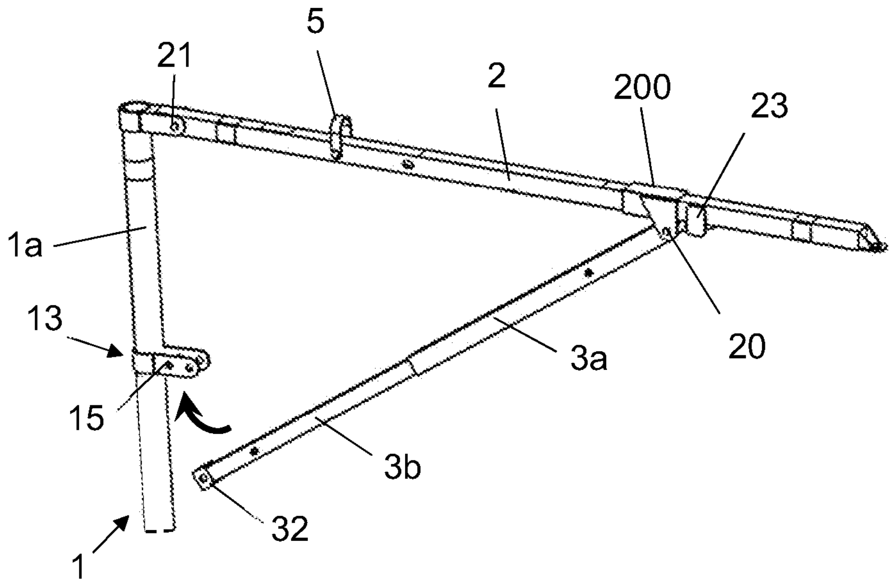

The operator continues to pull the second end 32 of the strut 3 so that the articulation 20 continues to slide towards the stop element 23 (see straight bold arrows in FIG. 6). A moment will come in which the articulation will abut against the stop element 23 and the user will know that it is time to rotate the strut 3 in a clockwise direction, with the centre of rotation at the articulation 20 (curved bold arrow of FIG. 6) and continuing to abut, the arm 2 will incline until it moves closer to a horizontal position, perpendicular to the mast 1, as shown in FIG. 7. In order to finally adopt the operating protection position, the user moves the second end 32 of the strut 3, which is provided with a through hole, until it is placed between the extensions 14 of the releasable joining means 13 and inserts the pin 17, passing through said second through hole of the second end 32 and the through holes 15 of the extensions 14.

In this way, it shows that the user can place the fall protection device 100 in the operating position themselves without needing external help, by only moving the strut 3, thus achieving that the arm 2 is located in a horizontal position at a height beyond the reach of a user standing on the horizontal work surface 90. Once the work has been carried out, the user would then carry out the inverse steps to change the fall protection device 100 from the operating protection position to the non-operating storage position (inactive position).

The invention claimed is:

1. A fall protection device for coupling a user who performs works on horizontal surfaces in construction sites to a fixed element of the construction, wherein the fall protection device is configured to adopt two end positions, the first being an operating protection position and the second being a non-operating storage position, the fall protection device comprising:

- a mast configured to be arranged vertically in the operating protection position, having an upper portion and a lower portion, wherein the lower portion of the mast is releasably couplable to a fixed element of the construction with the possibility of pivoting on its own vertical axis;
- an arm configured to be arranged horizontally in the operating protection position forming an inverted L with the mast, being provided at a first end with an articulated joint that is articulated with the end of the upper portion of the mast, the second end thereof being a free end and the arm being configured to receive in an area of the second end the coupling of fastening and attachment means for the user;
- a shock-absorbing strut to cushion the pivotal movement of the arm towards the mast caused by a downward traction force occasionally applied at an area of the end of the arm by the fastening and attachment means for the user, the strut being provided with a first end joined articulately to the arm and a second end intended to be fastened, in the operating protection position, on a point of the upper portion of the mast under the end of the upper portion where the mast is articulated with the arm,
- wherein the articulation of the first end of the strut with the arm is a sliding articulation configured to slide along the arm.

2. The fall protection device according to claim 1, wherein the arm is provided with a limit stop element to limit the sliding of the articulation of the first end of the strut with the arm, located between said articulation and the second end of the arm, and wherein the mast comprises releasable joining means for the releasable fastening of the second end of the strut, fixedly arranged on the upper portion of the mast on a point such that in the operating protection position, the second end of the strut is joined to the mast by said releasable joining means and the first end of the strut is in a position corresponding to that of the stop of the articulation with the stop element.

3. The fall protection device according to claim 1, wherein in the second non-operating storage position, the mast, arm and strut are arranged parallel to each other and with the strut flanked by the mast and the arm, the first end of the arm being articulately joined to the end of the upper portion of the mast, and the first end of the strut also being articulately joined to the arm by the articulation.

4. The fall protection device according to claim 2, wherein the releasable joining means of the mast for the releasable fastening of the second end of the strut project from the rest of the mast in a direction perpendicular to the same sufficiently to abut against the articulation of the first end of the strut with the arm when the fall protection device is in the second non-operating storage position, wherein said articulation is arranged between the articulated joint of the first end of the arm with the end of the upper portion of the mast and the releasable joining means with which the articulation abuts.

5. The fall protection device according to claim 4, wherein the releasable joining means of the mast for the releasable fastening of the second end of the strut comprise a pin and a U-shaped bracket or fork around the mast, the bracket or fork being configured by parallel extensions that are separated from each other by a distance for receiving between the same the second end of the strut in the operating protection position and for receiving between the same the first end of the strut in the non-operating storage position, the extensions having respective through holes suitable for the passage therethrough of the pin with the interposition of the second end of the strut between the extensions in the operating position, the second end of the strut being likewise provided with through holes for the passage therethrough of the pin.

6. The fall protection device according to claim 5, wherein the apical ends of the extensions of the U-shaped bracket or fork are separated from each other by a distance for receiving between the same, in the non-operating storage position, a section of the arm that is provided with a locking through hole for storage and wherein the apical ends of the extensions have secondary through holes suitable for the passage therethrough of a pin with the interposition of said section of the arm between the apical ends of the extensions in the non-operating storage position.

7. The fall protection device according to claim 1, which comprises hoisting hook-up means fixedly arranged on the arm between the articulated joint of the first end of the arm with the end of the upper portion of the mast and the articulation of the first end of the strut with the arm.

8. The fall protection device according to claim 1, wherein the strut comprises a female portion and a male portion that extending into an opening formed at the female portion, said female portion and male portion cooperating and sliding with respect to each other at the level of the opening when a compression force is transmitted to the first end of the strut, and wherein the female portion is provided with housings for respective cylindrical or spherical elements that roll or rotate due to friction with the male portion when the female and male portions slide with respect to each other, the dimensions of said elements being such that they interfere with the outer profile of the male portion, pressing and causing the successive plastic deformation of the male portion during its movement relative to the female portion.

9. The fall protection device according to claim 8, wherein the male and female portions respectively have an inner tubular section and an outer tubular section, which are concentric and intended to slide into one another.

10. The fall protection device according to claim 1, which comprises anchoring means that comprise an anchoring element inserted into a mass of concrete or mortar in a fluid state, and remaining solidified to the same after the setting or hardening of said mass, said anchoring means linking the fall protection device to the fixed element of the construction, and wherein the mast is movably coupled by its lower portion to said anchoring element with the possibility of pivoting on its vertical axis, in such a way that the user remains firmly fastened with the possibility of moving freely within an essentially circular field of action, around said vertical axis of the mast.

11. The fall protection device according to claim 10, wherein the anchoring element is a sleeve which receives in its interior the lower end of the mast with the possibility of pivoting on its vertical axis.

12. The fall protection device according to claim 11, wherein the lower end of the lower portion of the mast has a cylinder-shaped apical section followed by an inverted truncated cone section, similarly to the sleeve, which also has a cylinder-shaped apical section followed by an inverted truncated cone section corresponding to the lower end of the mast.

13. The fall protection device according to claim 1, wherein the mast has a cylindrical tubular section with the exception of a portion adjacent to the apical section of the lower end of the mast, the section of which is an inverted truncated cone.

14. The fall protection device according to claim 1, wherein the arm and the strut are formed by profiles with rectangular or square tubular cross sections.

15. The fall protection device according to claim 1, wherein the mast, arm and strut are formed by tubular profiles made of aluminium or an aluminium alloy.

16. The fall protection device according to claim 1, wherein the articulation of the first end of the strut with the arm forms part of a sliding carriage configured as a tubular case with open ends and movable along the arm and arranged around a section of said arm.

17. The fall protection device according to claim 1, wherein the articulation of the first end of the strut with the arm is configured as a groove made along at least one section of the arm and a pin that may slide along said groove, said pin being coupled to the first end of the strut.

18. A fall protection device for coupling a user who performs works on horizontal surfaces in construction sites to a fixed element of the construction, wherein the fall protection device is configured to adopt two end positions, a first being an operating protection position and a second being a non-operating storage position, the fall protection device comprising:

a mast configured to be arranged vertically in the operating protection position, having an upper portion and a lower portion, wherein the lower portion of the mast is releasably coupled to a fixed element;

an arm configured to be arranged horizontally in the operating protection position forming an inverted L with the mast, being provided at a first end with an articulated joint that is articulated with the end of the upper portion of the mast, the second end thereof being a free end and the arm configured to receive in an area of the second end the coupling of fastening and attachment means for the user;

a shock-absorbing strut to cushion pivotal movement of the arm towards the mast caused by a downward traction force applied at an area of the end of the arm by the fastening and attachment means for the user, the strut provided with a first end joined articulately to the arm and a second end configured to be fastened, in the operating protection position, on a point of the upper portion of the mast under the end of the upper portion where the mast is articulated with the arm, wherein the articulation of the first end of the strut with the arm is a sliding articulation configured to slide along the arm;

wherein the arm is provided with a limit stop element to limit the sliding of the articulation of the first end of the strut with the arm, located between said articulation and the second end of the arm, and wherein the mast comprises releasable joining means for the releasable fastening of the second end of the strut, fixedly arranged on the upper portion of the mast on a point such that in the operating protection position, the second end of the strut is joined to the mast by said releasable joining means and the first end of the strut is in a position corresponding to that of the stop of the articulation with the stop element; and wherein the releasable joining means of the mast for the releasable fastening of the second end of the strut project from the rest of the mast in a direction perpendicular to the same sufficiently to abut against the articulation of the first end of the strut with the arm when the fall protection device is in the second non-operating storage position, wherein said articulation is arranged between the articulated joint of the first end of the arm with the end of the upper portion of the mast and the releasable joining means with which the articulation abuts.

19. The fall protection device according to claim 18, wherein in the second non-operating storage position, the mast, arm and strut are arranged parallel to each other and with the strut flanked by the mast and the arm, the first end of the arm being articulately joined to the end of the upper portion of the mast, and the first end of the strut also being articulately joined to the arm by the articulation.

* * * * *